United States Patent [19]

Faudree, III

[11] 4,230,566
[45] Oct. 28, 1980

[54] FOAMACEOUS HYDROCARBON ADSORPTION MEDIUM AND METHOD AND SYSTEM FOR MAKING SAME

[75] Inventor: Thomas L. Faudree, III, Mentor, Ohio

[73] Assignee: Petrozorbent Corporation, Zanesville, Ohio

[21] Appl. No.: 919,957

[22] Filed: Jun. 28, 1978

[51] Int. Cl.² .............. B01D 15/00; C08G 18/14; B29G 7/02; B02C 18/44

[52] U.S. Cl. .............. 210/693; 210/924; 210/925; 241/280; 249/139; 264/51; 425/4 C; 521/99; 521/117; 521/160; 521/905; 521/918

[58] Field of Search .............. 521/918, 905, 99, 117, 521/160; 264/51; 425/4C; 210/DIG. 26, 39, 40, DIG. 27

[56] References Cited

U.S. PATENT DOCUMENTS

| | | | |
|---|---|---|---|
| 3,056,168 | 10/1962 | Terry | 521/918 |
| 3,453,221 | 7/1969 | Richart | 521/918 |
| 3,488,800 | 1/1970 | Kornylak | 425/4 C |
| 3,496,596 | 2/1970 | Buff | 425/4 C |
| 3,657,125 | 4/1972 | Strickman | 521/918 |
| 3,677,982 | 7/1972 | Marx | 521/918 |
| 3,681,237 | 8/1972 | Orban et al. | 210/DIG. 26 |
| 3,686,068 | 8/1972 | Leach | 521/918 |
| 3,739,913 | 6/1973 | Bogosian | 210/DIG. 26 |
| 3,888,766 | 6/1975 | DeYoung | 521/905 |

FOREIGN PATENT DOCUMENTS 2424322  11/1975  Fed. Rep. of Germany ............ 264/51

Primary Examiner—H. S. Cockeram

[57] ABSTRACT

A granular polyurethane cellular medium for absorbing water-borne, water insoluble hydrocarbons, method for its preparation and production system. The granular medium is formed by prereacting polyisocyanate or a prepolymer with a linear monohydric alcohol to form a prepolymer. This prepolymer subsequently is reacted with a polyol and blowing agent within a flexible sheet bun mold. Following molding of the bun within the flexible sheet, the bun is transferred to a comminution stage within a predetermined time period whereupon it is granulated. The material is fabricable at low cost and under a broad range of environmental conditions permitting flexibility in selecting the site for production of the material. The material exhibits an unusually high affinity for the water-borne contaminant hydrocarbons, does not absorb water and lends itself to low-cost production procedures.

16 Claims, 5 Drawing Figures

FOAMACEOUS HYDROCARBON ADSORPTION MEDIUM AND METHOD AND SYSTEM FOR MAKING SAME

BACKGROUND

Industrial cutting and grinding machinery in a broad range of forms is designed to operate in conjunction with fluid cooling systems wherein a liquid, i.e. mineral-free water, plus a soluble or emulsified oil is continuously circulated over work surfaces and the like to carry off thermal energy generated in machine operation. As the coolant is circulated within the machine environment, it gradually will become contaminated with hydrocarbon lubricants which migrate into the coolant flow path. Should this hydrocarbon contamination not be corrected, cooling efficiency of the machinery diminishes, smoke is produced and eventual clogging of the system with concomitant shutdown will ensue.

Generally such products as straw or cotton or various mixed cellulosic materials are used on oil spills for the absorbent medium, the latter having a dusty character found to be objectionable. These conventional oil adsorbing materials are not ideal inasmuch as with their use the resultant weight-to-weight ratio of adsorbent material to oil picked up is less than one-to-ten in most instances. Granulated polystyrene foam has been used as an absorber of oil and like hydrocarbons due to the oil affinity of its surface achieved by virtue of its hydrocarbon content. However, polystyrene materials must be "blown" or produced under carefully controlled factory conditions, generally a methylchloride or the gaseous blowing agent being used and high temperature heat sources being required for carrying out the reactions involved. Thus, such materials are too costly for most applications.

Over the recent past, as the transportation of petroleum products by sea has greatly expanded, significant oil spills have been encountered. When these spills migrate toward land, it has been necessary for governmental agencies and affected industy to carry out clean-up procedures, all such currently envisioned procedures being of questionable effectiveness. Usually, elongate floating containers fashioned of inexpensive oil adsorbents within a perforate retainer or casing are formed as adsorbant booms in a line and floated against the oil slick to gradually confine and collect it. Typical adsorbent materials used within these devices are essentially the same as described above in connection with industrial machinery utilization and, in addition to having the noted relatively low oil pick-up ratio, tend to adsorb water and sink after a limited period of use. Of course the costs encountered in transporting the very light adsorbing materials to the site of an oil collecting activity are somewhat prohibitive in view of the low density of the materials involved.

SUMMARY

The present invention is addressed to a new, low density, polymeric medium for adsorbing hydrocarbons insoluble in water with significantly enhanced efficiency. Provided in granular form, the material readily absorbs contaminant hydrocarbons on weight-to-weight bases at the level of about 40:1. Of particular importance, the new material is producible, utilizing the method and system of the invention, under a broad range of ambient temperatures and at costs competitive with the least expensive, materials of lower efficiency heretofore available in the market.

As a further feature and object of the invention, a low density granulated polyurethane cellular polymer is provided having an excellent water-insoluble hydrocarbon absorption characteristic which is produced by pre-reacting a polyisocyanate with a long-chain monohydric alcohol or mixture of long-chain monohydric alcohol of about 8 to 12 carbon atoms inclusive to form a prepolymer. Following the formation of this prepolymer, a polyol is combined therewith in the presence of a blowing agent. Before the substantial reaction of this mixture takes place, it is transferred to a mold to permit the exothermic development of a cellular polyurethane. Within a predetermined time from the development of the resultant cellular polyurethane bun, the formation is transferred to a comminution stage whereupon it is reduced to granular size.

Formation of the polymeric cellular bun occurs within a bun mold fashioned from a flexible polymeric sheet which is suspended between two supports. With the arrangement, the reaction mixture is simply poured along a trough-shaped configuration of the polymeric sheet and thus deposited, immediately commences an expansive reaction therewithin to form the bun. Removal of the resultant bun is carried out by the simple expedient of moving the polymeric sheets or supports apart from each other. Formation of the cellular polymer within the mold can take place under a broad range of ambient conditions, inasmuch as the foam becomes self insulative and the reaction is exothermic. Thus, the heat so generated is retained within the bun as it is formed to sustain the reaction. Consequently, a manufacturing system for the materials can be established at convenient locations, for example at the shoreline or on shipboard in the case of producing material to remove an oil spill on the seas.

As another feature and object, comminution of the cellular polymeric bun is carried out within a limited time frame, i.e. usually within about one half hour of the formation thereof. Extended intervals between the formation of the bun and comminution thereof has been observed to evolve an excess quantity of fine particles of the resultant granulated material, whereas, when comminution is carried out promptly, a more uniformly desirable particle size distribution is achieved.

As another object and feature of the invention, a granular material is provided having a high capacity for adsorbing water insoluble hydrocarbons such as oil and grease. Further, the material also is characterized in exhibiting a low absorption of the water carrier of the contaminant, thus improving its utilization as a material for treating sea born oil excursions.

A further feature and object of the invention resides in the provision of a system comminution stage of high practicality which may be positioned adjacent the system bun mold, thus facilitating manual movement of the bun polymeric formations thereof to comminution with promptness. A particularly important feature of the comminution stage resides in its capabilities for rupturing the cells of the formed polymeric bun. When such cells are subjected to a rupturing effect they tend to hold oil within the cavities thereof. This enhanced concentration of the oil also tends to promote the buoyancy of the material for purposes of recovering oil spilled from seas. The comminution stage is formed of a support frame which carries a relatively large cylindrical wheel which may be formed of laminated wood or the like and which supports a plurality of spaced cutters formed of spring steel or the like which are fixed to the periphery of the wheel and have outwardly exposed edges, the widthwise extent of which are generally parallel with the axis of rotation of the wheel. The wheel is situated at the terminus of a relatively elongate conveyor arrangement and both the conveyor and the cutter wheel are driven from a relatively low power motor arrangement, i.e. in the range of about ¾ horsepower. A hopper beneath the wheel collects granulated polymeric material, while a hood above the assembly assures no loss thereof. That component of each foamaceous bun which is rejected by the comminution stage is recovered as valuable material and deposited within the flexible polymeric sheet for the next succeeding charging thereof. Thus, there is essentially no waste in the entire process, again enhancing the high practicality and low cost nature thereof.

Other objects of the invention will, in part, be obvious and will, in part, appear hereinafter.

The invention, accordingly, comprises the product, method, system and apparatus possessing the combination of elements, steps, construction and arrangement of parts which are exemplified by the following detailed disclosure.

For a fuller understanding of the nature and objects of the invention, reference should be had to the following detailed description taken in connection with the accompanying drawings.

DETAILED DESCRIPTION

Polyurethane foams evidencing a broad range of physical characteristics have been produced by industry for some period of time. The procedures generally utilized for preparing isocyanate terminated prepolymers and reacting these polymers to produce a cellular rigid foam have been described extensively. See for example, *Saunders and Frisch,* "Polyurethanes: Chemistry and Technology, II Technology" pp. 193-239, Interscience Publishers, New York 1964. To achieve the necessary absorption qualities for the instant product, however, a particular prepolymer is developed and two reaction procedures as well as comminution to achieve granulation and cell rupturing of the closed cell foam are carried out both with a unique molding procedure as well as within limited time frames.

Figure 1:
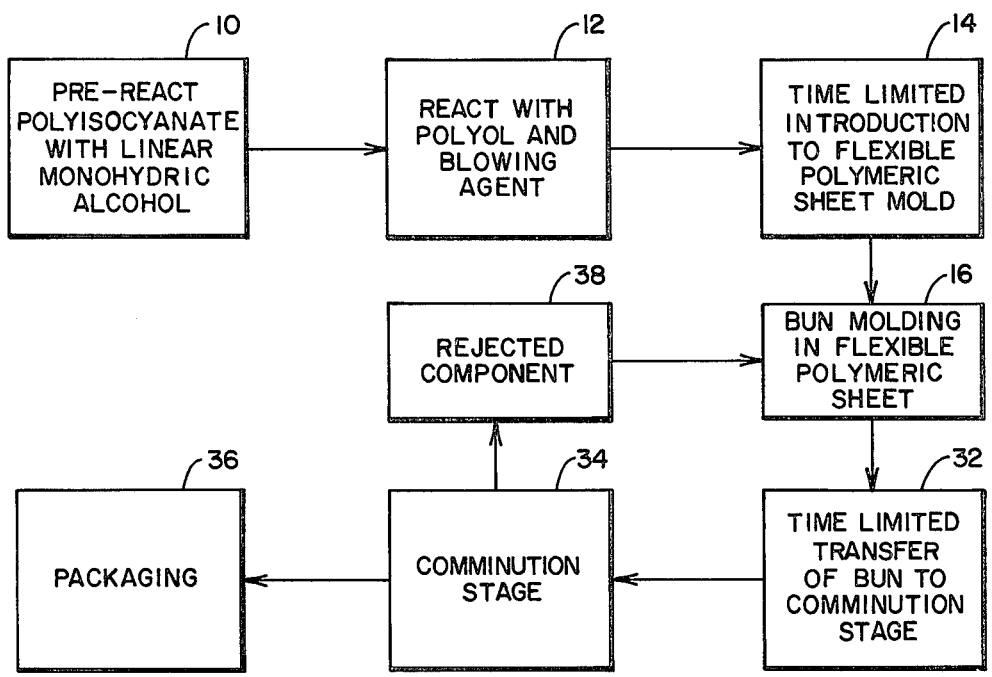
FIG. 1 is a block flow diagram of the process of the invention.

Looking to FIG. 1, the procedures for carrying out the process of the invention are outlined. Block 10 identifies a prereaction step wherein polyisocyanate is reacted with a linear, monohydric alcohol to achieve the hydrocarbon affinity of the product. This alcohol is a long chain monohydric alcohol or mixture of alcohols of about 8 to 12 carbon atoms per molecule and the prereaction results in the formation of a prepolymer. Greater surface affinity for oils or similar contaminant hydrocarbons can be achieved by increasing the average number of such carbon atoms per molecule. However, as that number is increased, longer reaction times are encountered which tend to lessen the very high practicality of the process as is achieved with the $C_8$–$C_{12}$ alcohol selection. The amount of alcohol employed is about 10% to 25% of the stoichiometric amount that would be required for complete reaction with the polyisocyanate. The amount of alcohol employed with respect to the weight of the polyisocyanate has been found to represent an important aspect for achieving highest absorbancies. In this regard, where the alcohol content, for instance, utilizing $C_{10}$–$C_{12}$ alcohol mixes is maintained between about 5 and 15% by weight of polyisocyanate, high absorbancies are achieved. Particularly, highest absorbancies are witnessed where $C_{10}$–$C_{12}$ mixed alcohols are provided at about an 11% by weight polyisocyanate. The following tabulation shows absorbancy data for a range of such alcohol contents:

| % Available NCO Reacted | Absorbancy* Ratio (weight basis) |
|---|---|
| 0.1% | 28.7:1 |
| 5.3% | 29.8:1 |
| 11.1% | 34.4:1 |
| 12.9% | 25.5:1 |
| 25.0% | 5.8:1 |

Cell size was approximately .050 inch. If more than 25% of the available isocyanate is reacted, foam building becomes increasingly difficult and the backbone of the material is destroyed.
*Absorbancy Ratio is defined as the weight in pounds of SAE 30 motor oil absorbed by 1 pound of the test material.

As revealed at block 12, the prepolymer compounded at block 10 is mixed and reacted with a polyol, blowing agent and catalyst within a suitable container, which for on-site production, may be a common bucket. Once the polyol, blowing agent, and catalyst are mixed with the prepolymer, a limited time frame or period is available to the operator to transfer the mixture to a mold. As represented at block 14, this time limitation at ambient temperatures of around 60° to 70° F. is in the range of 18 seconds and expands as the temperature decreases from those levels. Introduction of the mixture to the mold should be carried out before any significant reaction commences, the operator being apprised of the commencement of reaction by the initiation of foaming within the receptacle, i.e. a bucket, used for the initial mixing as at block 12. As represented at block 16, molding takes place by depositing the above mixture upon a thin flexible polymeric sheet shaped as a trough.

The linear monohydric alcohol serves to increase surface affinity for hydrocarbons and, in view of its linear nature, serves to promote flexibility to the polyurethane product due to a built-in plasticizing property according to the reaction:

where $x=2-5$ and $y=0.01_x-0.25_x$ R′ is linear aliphatic or combination linear aliphatic or and para disubstituted aromatic i.e. —CH$_2$CH$_2$ .... CH$_3$

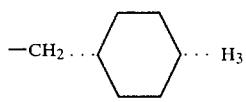

Figure 2:
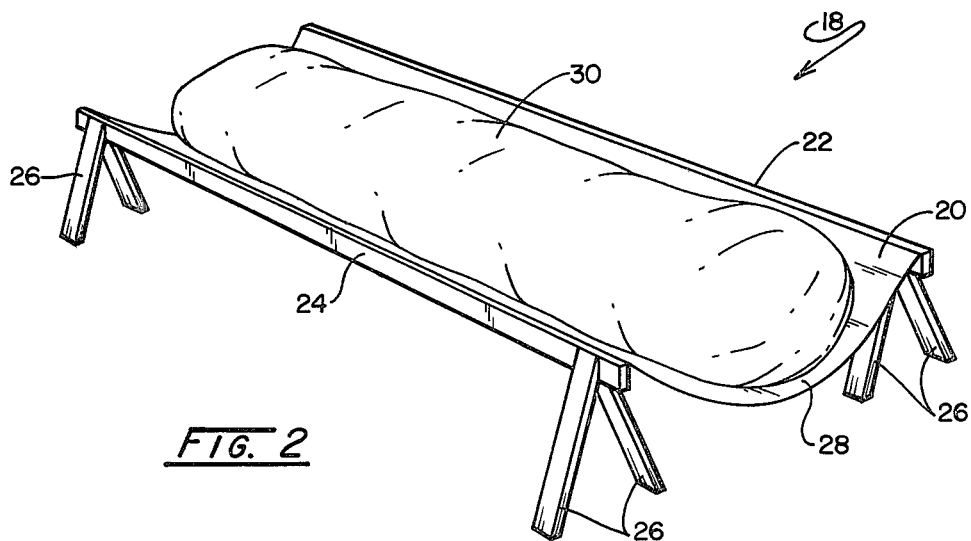
FIG. 2 is a perspective representation of the bun mold utilized with the invention.

Looking momentarily to FIG. 2, a molding sheet 20, which may be formed of polyethylene, is attached to and suspended between two parallel and mutually spaced components or beams 22 and 24 which, in turn, are suspended above supporting terrain by V-shaped leg structures 26 to provide a "saw-horse" configuration. To utilize the mold 18, beams 22 and 24 are placed in spaced parallel juxtaposition such that a trough region 28 is formed by sheet 20. The operator then pours the admixed polyol, blowing agent and prepolymer as it commences to react along the region 28, whereupon a bun or elongate cellular polymeric formation 30 rapidly is produced.

Generally, the mixture is poured into trough region 28 along a length of about 6 feet to produce a readily manually handled formation 30. Following the rather rapid reaction taking place within region 28, the resultant bun 30 is released simply by pulling beams 22 and 24 outwardly from each other to expose the formation, permitting it to be manually picked up. As noted above, in the past, expensive molding devices have been required inasmuch as the release of such cellular foamaceous buns has been achieved only with considerable difficulty. Molds as at 18 readily can be transferred to a given site for bun production and involve no significant capital expenditure, as is apparent from the drawing. The polyurethane foams produced according to the invention readily release from the surface of the polymeric sheet 20 at least 20 or more utilizations thereof being available with the arrangement before the simple and inexpensive replacement of sheet 20 is required. As discussed above, the exothermic reaction taking place is combined with the natural insulative quality of the outer surface of the reacting materials at 28, consequently, the molding process is one which is substantially immune from ambient temperature variations, production being achieved readily at temperatures at least as low as 40° F.

Returning to FIG. 1, the reaction forming bun 30 typically takes place very rapidly, i.e. usually in a period of time less than a minute, whereupon it is manually removed as described and, as indicated by block 32, is transferred to a comminution stage, again within a limited time frame or period. The interval selected for submitting the formation to comminution is selected by virtue of the somewhat "rubbery" texture of the formation shortly following its development. This quality of structure is one enhancing the comminution to permit a more uniform desired granular size output and cell rupture. Generally, the bun 30 should be submitted to comminution within about one half hour following its formation or at least before its structure alters from the "rubbery" quality to one which may be designated brittle to the extent that it would produce excessive fines and minimal cell rupture when submitted to comminution.

The comminution stage is represented at block 34. At this stage of the process the bun is granulated or ground and the resultant granules are packaged or otherwise appropriately treated as represented by block 36. As indicated hereinabove, it is important that the comminution stage carry out a rupturing of the cells forming the bun. By causing such rupturing, the material tends to hold the oil within the ruptured cavities and thus promote its own buoyancy. Additionally, through the use of a rupturing effect upon cells, generally larger ruptured cell particles may be produced at the comminution stage to achieve production advantage. Very often, a small component of the bun formation 30 will be rejected by the grinding elements of stage 34. These components, as represented by block 38, may be returned to mold 18 for recycling. To carry this out, the operator merely drops the rejected pieces into trough 28 of mold 18 prior to a next charging procedure, as discussed in connection with block 14 and FIG. 2. Polyisocyanate employed in the preparation of the prepolymer is readily commercially available and comprises an aliphatic, cycloaliphatic, or aromatic polyisocyanate having preferably from two to five isocyanate groups. If desired, mixtures of polyisocyanates can be employed. Suitable polyisocyanates include the aliphatic polyisocyanates such as hexamethylene diisocyanate, alicyclic polyisocyanates such as 4,4' dicyclohexylmethane diisocyanate, and aromatic polyisocyanates such as 2,4- and 2,6-tolylene diisocyanate, diphenylmethane diisocyanate, and the dimethyl derivatives thereof. Further examples of suitable polyisocyanates are 1,5-naphthalene diisocyanate, triphenylmethane triisocyanate, xylyene diisocyanate, and the methyl derivatives thereof, polymethylene polyphenyl isocyanates, chlorophenylene-2,4-diisocyanate, and the like. The preferred polyisocyanates are aromatic polyisocyanates and particularly diphenylmethane diisocyanate, triphenylmethane triisocyanate, polymethylene polyphenylisocyanate, complex commercially-available compositions containing polymeric isocyanates sold under such trademarks as "PAPI", "Mondur MR" and "NCO-120" and mixtures thereof.

Typical polyols used as described in connection with block 12 include: ethylene glycol; propylene glycol; butylene glycol; glycerol; trimethylolpropane; trimethylolethane; 1,2,6-hexanetriol; pentaerythritol; diethylene glycol, dipropyleneglycol; and the like. Typical dicarboxylic acids include: adipic acid, succinic acid, azaleic acid, phthalic acid, isophthalic acid, terephthalic acid, chlorendic acid, tetrabromophthalic acid and the like, and the corresponding anhydrides where such anhydrides exist. Also, long chain dimer acids may be used to form useful polyols by esterification with polyols, especially diols such as ethylene glycol and the like. For the purposes of this invention, useful polyesters should have a minimum hydroxyl number of about 200, and preferably above about 250, with best results being obtained from those polyesters having hydroxyl numbers in excess of about 300.

Another useful class of polyols which can be employed are the trialkanolamines which, by reaction with alkylene oxides, form adducts of suitable molecular weight, and the alkylene oxide adducts thereof. Illustrative of the lower molecular weight trialkanolamines include triethanolamine, triisopropanolamine and tributanolamine. The alkylene oxide adducts which can be employed are preferably those wherein the oxyalkylene moieties thereof have from 2 to 4 carbon atoms.

Another useful class of polyols which can be employed are the alkylene oxide adducts of mono- and the polyamines and also ammonia. These may be termed aminic polyols.

The mono- and polyamines are preferably reacted with alkylene oxides which have 2 to 4 carbon atoms, for example, ethylene oxide; 1,2-epoxypropane, the epoxybutanes; and mixtures thereof. Mono- and polyamines suitable for reaction with alkylene oxides include, among others, methylamine, ethylamine, isopropylamine, butylamine, benzylamine, aniline, the toluidines, naphthylamines, ethylenediamine, diethylenetriamine, triethylenetetraamine, 1,3-butanediamine, 1,3-propanediamine, 1,4-butanediamine, 1,2-, 1,3-, 1,4-, 1,5- and 1,6-hexanediamine, phenylenediamines, toluenediamine, naphthalenediamines and the like. Among the compounds of the above groups which are of particular interest are, among others, N,N,N',N'—tetrakis(2-hydroxyethyl) ethylenediamine; N,N,N',N' tetrakis(2-hydroxypropyl)ethylenediamine; N,N,N',N'—pentakis (2-hydroxypropyl)diethylenetriamine; phenyldiisopropanolamine and higher alkylene oxide adducts of aniline, and the like. Others which deserve particular mention are the alkylene oxide adducts of aniline or substituted aniline/formaldehyde condensation products.

Blowing agents which may be utilized in forming the foamaceous character of the product of the invention include the liquid but relatively volatile halocarbons, such as the following perhalocarbons containing 1, 2 or even up to 4 carbon atoms, are especially desirable for the purpose. These include the following.

| | | |
|---|---|---|
| $CCl_3F$ | $C_2Cl_2F_4$ | $CClF_3$ |
| $CCl_2F_2$ | $CHCl_2F$ | $CHClF_2$ |

The halocarbons having one and two carbon atoms are preferred, and of these, trichloromonofluoromethane and dichlorodifluoromethane are particularly useful in commercial preparations. These are added as liquids in quantities of about 10 percent or less to about 20 percent or more, by weight of the total resin to the blended polyolpolyisocyanate mixtures, or to one or more components thereof, and are substantially volatized in the liquid mixture to effect cellulation. Subsequently, the mixture cures to a hardened, cellular state.

Although the halocarbons are especially desirable as blowing agents when exceptional insulative properties are desired, other blowing agents, such as water, carbon dioxide, and the like, can be utilized in this invention.

A few of the foam formulations described herein require no catalyst. Such formulations will contain rather substantial quantities of such amino hydrogen donors triethanolamine, or other such highly reactive nitrogen containing compound. Most foam formulations described herein will require a catalyst, preferably an amine compound such as triethylene diamine, bis (2-dimethylaminoethyl) ether and metallic soaps such as dibutyltin dilaurate or stannous octoate.

Figure 3:
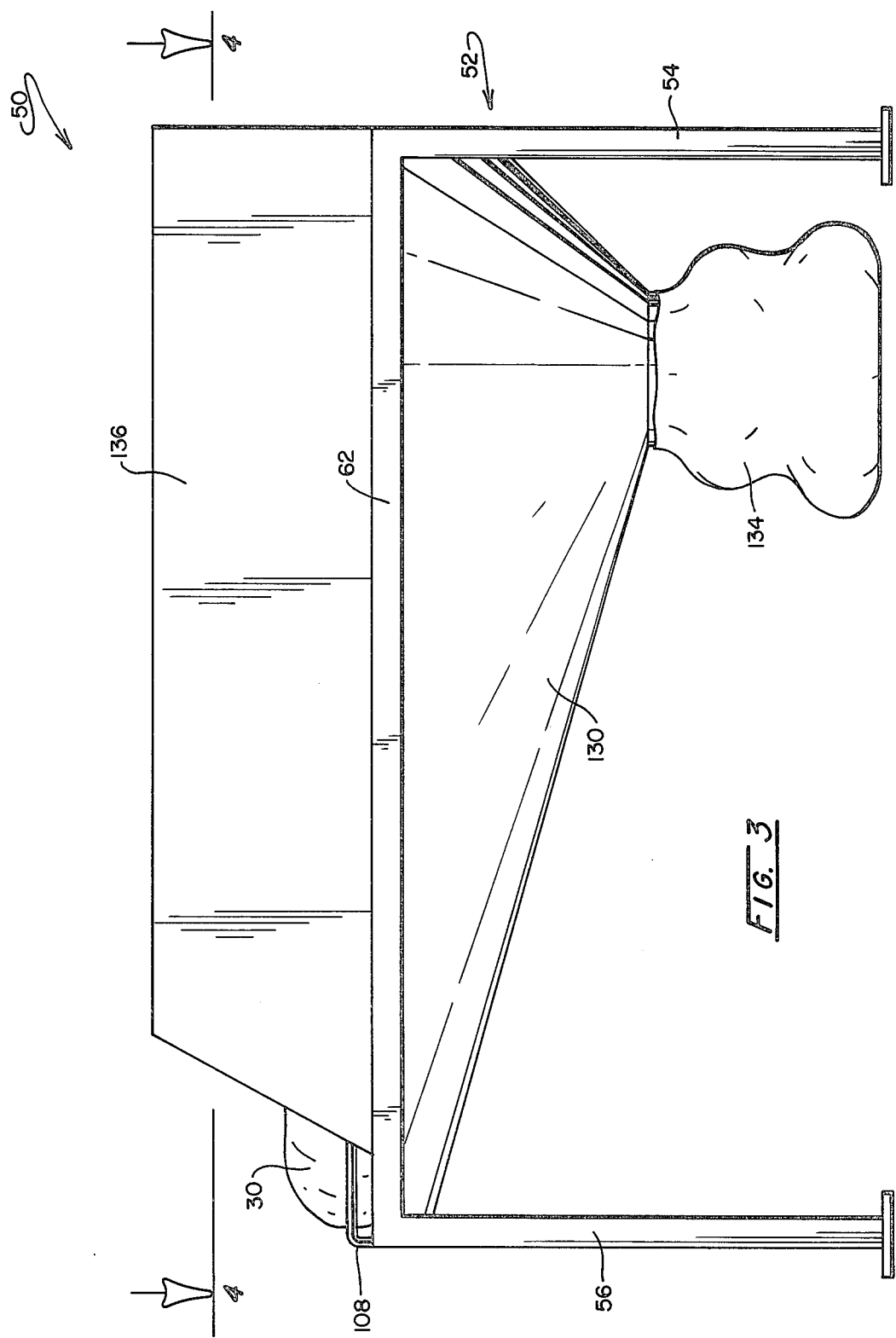
FIG. 3 is a side view of the comminution stage of the invention.
Figure 4:
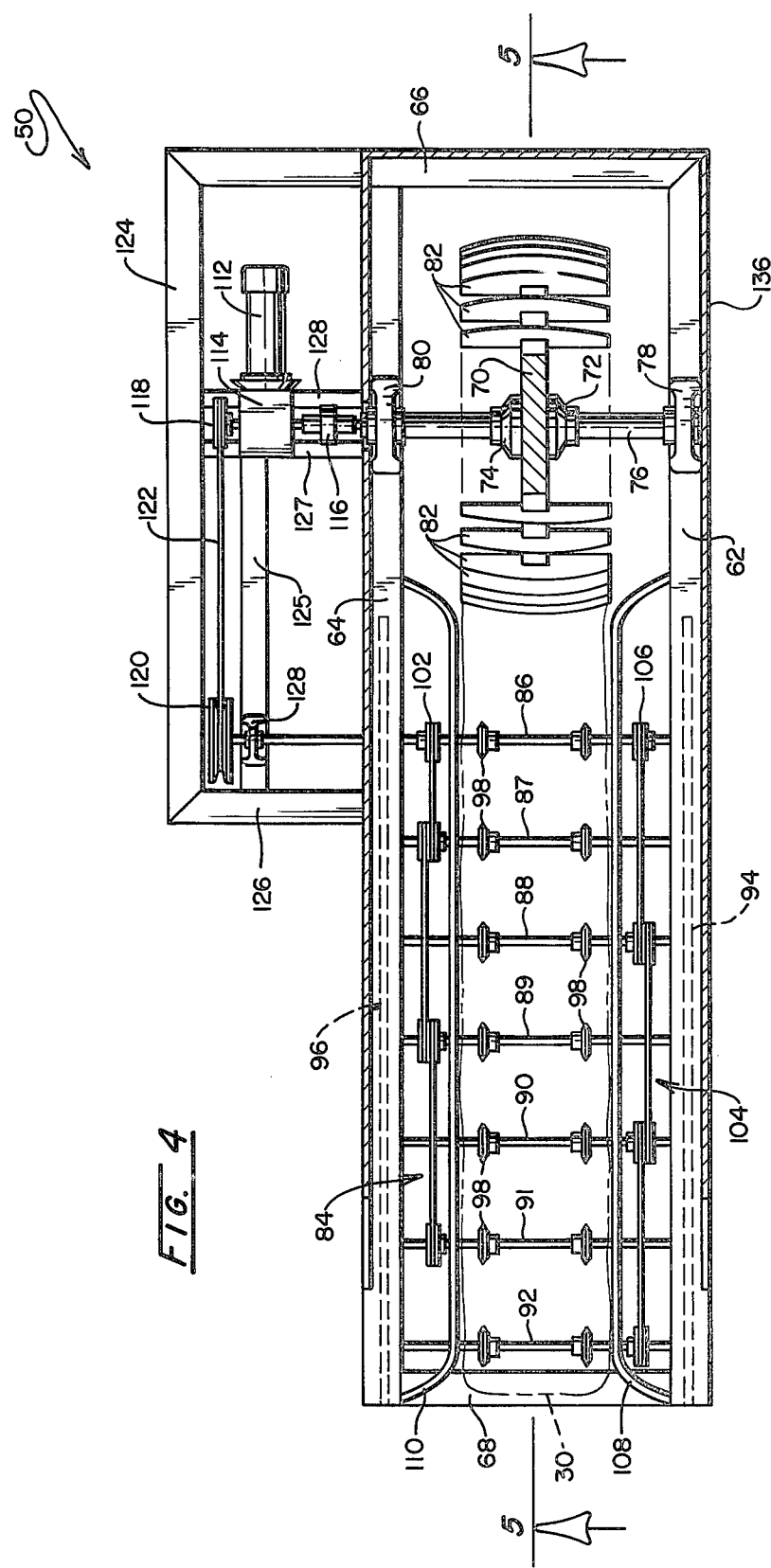
FIG. 4 is a top sectional view of the comminution stage of the invention taken through the plane 4—4 of FIG. 3.
Figure 5:
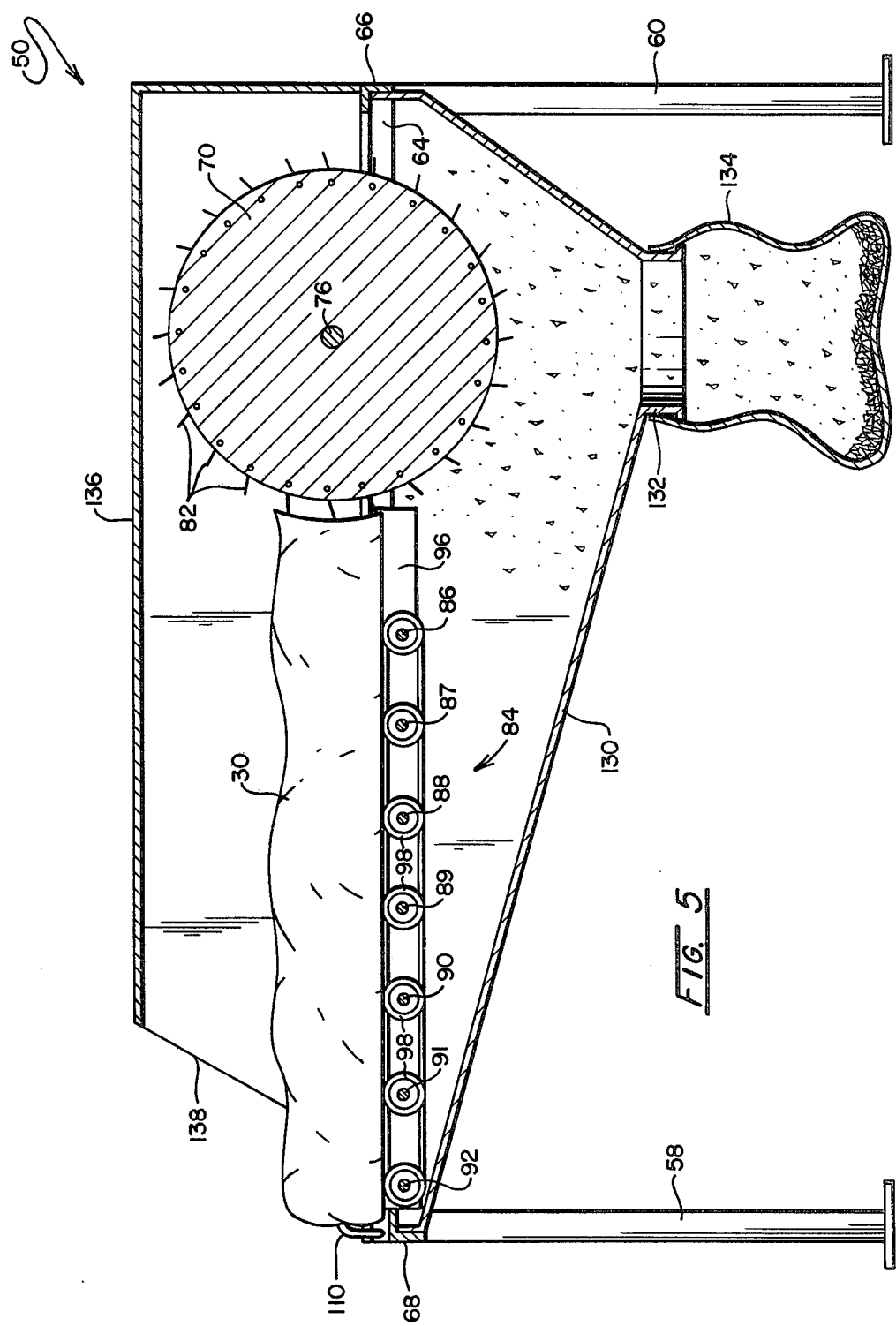
FIG. 5 is a sectional view of the comminution station of the invention taken through the plane 5—5 shown in FIG. 4.

Referring to FIGS. 3-5, a highly practical comminution stage for use as described in conjunction with block 34 of FIG. 1 is illustrated generally at 50. Stage 50 includes a support frame 52 formed of angle stock or the like, having upstanding legs 54, 56 (FIG. 3) and 58 and 60 (FIG. 5). These legs support two elongate substantially parallel and horizontally oriented support members 62 and 64 as well as end components 66 and 68. The support members and end components are suitably joined to serve to define an elongate rectangular frame which is supported in table fashion by legs 54, 56, 58 and 60.

Members 62 and 64 support a grinding assembly which is fashioned having a flywheel 70 formed as a cylinder having a radius of at least about 20 inches which may be constructed of laminated wood, the lamination having a thickness for instance, on the order of about 3–4 inches. Flywheel 70 is rotatably drivably mounted by flanges 72 and 74 to a drive shaft 76. Shaft 76, in turn, is journaled for rotation between two pillow blocks 78 and 80, the latter respectively being mounted upon horizontal supports 62 and 64.

About the periphery of flywheel 70 are mounted a plurality of spaced cutter blades certain of which are identified by numeral 82. Preferably formed of spring steel of about 14 gauge thickness, each of the blades 82 has a widthwise extent generally parallel with the axis of rotation of flywheel 70 as well as a curved or arcuit outwardly disposed edge. The mounting of the cutters 82 upon flywheel 70 is by insertion within slots cut into the periphery thereof and through the utilization of tabs (not shown) in conjunction with screws extending into the flywheel surfaces. Note, that this mounting provides that each of the cutter blades 82 are canted at an acute angle with respect to any associated radius of flywheel 70 extending to them.

Flywheel 70 is generally situated along the bisecting elongate central axis of the assembly 50 and at the outlet end of a conveyor shown generally at 84. Conveyor 84 is formed of a series of drive shafts 86–92 which are journaled for rotation between oppositely disposed support plates 94 and 96. Two knife edge conveyor drive wheels, certain of which are identified by numeral 98, are fixed to each of the shafts 86–92 at spaced apart positions so as to support and drive bun 30 inwardly toward the blades 82 of flywheel 70. Rotational drive is imparted to shafts 87, 89 and 91 by a drive pulley and belt assemblage 100 extending from pulley 102 fixed to shaft 86. In similar fashion, shafts 88, 90 and 92 are driven from a drive pulley and belt assembly 104 from pulley 106 fixed, in turn, to shaft 86. To assure alignment of bun 30 along the elongate bisecting axis of assembly 50, tubular guide members 108 and 110 are welded respectively to support members 62 and 64. Conveyor drive wheels 98 may be present in the knife edge configuration shown or may be formed in sprocket fashion having teeth which provide a more positive engagement with the lower surface of bun 30.

As is revealed in FIG. 4, a motorized drive arrangement is provided both for flywheel 70 and conveyor 84 by a d.c. motor 112 operating through a gear reduction train 114. In this regard, drive to shaft 76 is provided from gear reduction train 114 through a coupling 116. A lower speed drive is imparted to shaft 86 of the conveyor 84 by a drive output of gear reduction train 114 including pulleys 118 and 120 and belt 122. Note, that the drive arrangement is supported by frame extension members 124–128. Pulley 120 is journaled over and fixed to drive shaft 86 and the latter additionally is supported by pillow block 128.

Looking to FIGS. 3 and 5, a hopper 130 is shown positioned beneath flywheel 70 and conveyor 84. This hopper is formed having an outlet duct or port 132 through which granulated components of bun 30 are directed following contact. From port 132 the material may be bagged as at 134 or directed by suitable conveyor means to a receiving and storage facility. Additionally, the figures reveal the presence of a hood 136 mounted upon support members 62 and 64 and having an opening at 138 through which the elongate bun formation 30 may be passed or driven upon conveyor 84.

To afford some insight into the size and transportability of the comminution stage 50, the drive shaft 76 of flywheel 70 stands generally about eight feet above ground level, while the top of the hood 136 is about ten and one half feet above ground in a typical installation. Additionally, the width of the entire device has at maximum dimension of about 5½ feet, its length is about 12½ feet, while a typical weight for the entire assembly is about 2,250 pounds. Accordingly, the device is of such a size that it can be trucked to a region, i.e. shipboard or a sea coast where production can be carried out at a location practical for the practical shipment of the granular material.

In utilizing stage 50, the operator removes a bun 30 from mold 18 (FIG. 2) and carries it to the hood entrance 138, whereupon it is deposited upon conveyor 84. Bun 30 is driven into the cutters 82 of flywheel 70 and the resultant granulated material is collected through duct 132. As indicated earlier, it has been found that the comminution stage as above described ideally functions to rupture the cells of the foam bun. With this effect, the cells are not fully granulated but exist in one ruptured form or another and thus tend to provide cavities within which the oil is absorbed. In addition to enhancing the capability of the material to take up waste oil hydrocarbons, the absorption of the oil tends to avoid absorption of water and thus enhances the buoyancy of the material. The rate at which conveyor 84 is driven generally will determine the particulate size evolved, and can be adjusted accordingly through the belt and pulley arrangement as well as gear reduction assembly 114. As the trailing portion of bun 30 approaches blades 82 of flywheel 70, generally a small component or portion thereof is thrown outwardly toward opening 138. This piece is collected by the operator and deposited within the trough region 28 of mold 18, whereupon it is incorporated within a next succeeding molded bun 30. As noted above, essentially no waste is encountered in the operation of the system.

Since certain changes may be made in the above product, method, system and apparatus without departing from the scope of the invention herein involved, it is intended that all matter contained in the above description or shown in the accompanying drawings shall be interpreted as illustrative and not in a limiting sense.

What is claimed is:

1. The method for producing a granulated, low density cellular polymer for use in adsorbing water-insoluble hydrocarbons, comprising the steps of:
   pre-reacting an organic polyisocyanate with a linear, monohydric alcohol selected from the group consisting of long chain alcohols of from about 8 to 12 carbon atoms inclusive per molecule to form a prepolymer, the proportion of said alcohol being between about 10% and 25% of the proportion required to completely react with said polyisocyanate;
   combining said prepolymer with a polyol in the presence of a blowing agent;
   transferring said combined prepolymer and polyol prior to the substantial reaction thereof to a mold to effect the exothermic development of cellular polymeric formation; and
   comminuting said cellular polymeric formation to granular size.

2. The method of claim 1 in which:
   said transfer of said combined prepolymer and polyol is made into a bun mold formed of a flexible polymeric sheet suspended between support means.

3. The product of the method of claim 2.

4. The method of claim 1 in which:
   said step of comminuting said cellular polymeric formation is carried out within about ½ hour of the completion of said development thereof.

5. The method of claim 1 including the step of introducing components of said cellular polymeric formation not fully comminuted at said comminution stage to said mold prior to the next succeeding said transfer thereinto of said combined prepolymer and polyol.

6. The method of claim 1 in which said polyol is combined with said prepolymer in an amount greater than that required for complete reaction with said prepolymer.

7. The product of the process of claim 1.

8. The method of claim 1 wherein the proportion of said alcohol is between about 5% and 15% by weight of said polyisocyanate.

9. The method of claim 8 wherein said alcohol is of from about 10 to 12 carbon atoms per molecule and mixtures thereof.

10. The method of claim 9 wherein the proportion of said alcohol is about 11% by weight of said polyisocyanate.

11. The method of claim 1 wherein said alcohol is a linear aliphatic alcohol or a linear aliphatic alcohol with para-diphenyl substitution.

12. The method of claim 1 wherein said polyisocyanate is an aliphatic, cycloaliphatic, or aromatic polyisocyanate having from about 2 to 5 isocyanate groups per molecule.

13. The method of claim 12 wherein said polyisocyanate is selected from the group consisting of hexamethylene diisocyanate, 4,4'-dicyclohexylmethane diisocyanate, 2,4- and 2,6-tolylene diisocyanate, diphenylmethane diisocyanate, 1,5-naphthalene diisocyanate, triphenylmethane triisocyanate, xylyene diisocyanate and its methyl derivatives, chlorophenylene-2,4-diisocyanate, triphenylmethane triisocyanate, polymethylene polyphenyl isocyanate, and mixtures thereof.

14. The method of claim 1 wherein said polyol is a glycol, a polyester with hydroxyl number of at least about 200, a trialkanolamine and alkylene oxide adducts of mono and polyamines, and mixtures thereof.

15. A low density cellular polymer exhibiting a surface characteristic for adsorbing water-borne insoluble hydrocarbons, which polymer comprises the reaction product obtained by reacting in the presence of a blowing agent:
   (a) a prepolymer which is the reaction product of:
      (1) a polyisocyanate, and
      (2) an alcohol selected from the group consisting of long chain monohydric alcohols of from about 8 to 12 carbon atoms per molecule and mixtures thereof, said alcohol being employed in an amount of about 10% to 25% of the stoichiometric amount required to react completely with the polyisocyanate; and
   (b) a polyol present in a proportion developing a slight excess unreacted polyol to insure a complete reaction thereof with said polyisocyanate.

16. A method of removing oil from an oil-water mixture comprising contacting said oil-water mixture with the comminuted cellular product of claim 15 thereby selectively adsorbing said oil on said product.

* * * * *